United States Patent
Martin et al.

(10) Patent No.: US 6,571,357 B1
(45) Date of Patent: May 27, 2003

(54) HIGH SPEED DEVICE EMULATION COMPUTER SYSTEM TESTER

(75) Inventors: Matthew A. Martin, East Palo Alto, CA (US); Everett Basham, Sunnyvale, CA (US); Christopher D. Price, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/563,006

(22) Filed: Apr. 29, 2000

(51) Int. Cl.[7] ................................................. H02H 3/05
(52) U.S. Cl. .................... 714/28; 714/29; 714/738; 714/742; 703/23; 703/24; 703/25
(58) Field of Search ........................... 714/28, 29, 741, 714/742, 738; 703/23–25

(56) References Cited

U.S. PATENT DOCUMENTS

| | | | | |
|---|---|---|---|---|
| 4,727,312 A | * | 2/1988 | Fulks ........................... | 714/738 |
| 4,951,283 A | * | 8/1990 | Mastrocola et al. ........... | 714/43 |
| 5,889,936 A | * | 3/1999 | Chan ........................... | 714/738 |
| 6,223,148 B1 | * | 4/2001 | Stewart et al. ................ | 714/39 |
| 6,289,472 B1 | * | 9/2001 | Antheunisse et al. ......... | 714/28 |

* cited by examiner

Primary Examiner—Robert Beausoliel
Assistant Examiner—Michael Maskulinski

(57) ABSTRACT

The application discloses a system and method for providing a compact and high speed mechanism for emulating an ASIC or other chip operating within a large computing system environment for diagnostic purposes. A two step process is disclosed for generating data patterns for fully exercising a chip and to then transmit these data patterns at a high frequency to a system under test. In phase one, a pattern generator preferably transmits test pattern data at a first frequency to a memory storage device. In phase two, the memory storage device is enabled to transmit the stored test pattern data at a high frequency to a system under test. Buffering the test pattern data in this manner enables the inventive system to bypass the data transmission speed limitation of the pattern generator while still employing the test patterns created by the pattern generator and to thereby test the system under test under high speed operating conditions.

20 Claims, 5 Drawing Sheets

HIGH SPEED DEVICE EMULATION COMPUTER SYSTEM TESTER

TECHNICAL FIELD

This invention relates in general to computer system testing and in particular to testing of a computer sub-system employing an chip emulation.

BACKGROUND

When testing computer system components which are in development, various chips and other components are commonly not yet available making it impossible to test certain computer system or sub-system configurations in their final form. Accordingly, in order to test certain computer sub-systems, certain components are generally emulated in order to allow the rest of the sub-system to be operated and observed.

Generally, prior art solutions involved emulating the operation of an entire board where any portion of the board was not yet available in production form in order to enable various boards interacting with the incomplete board to be tested. This approach would generally enable boards other than the one being emulated to be tested but would generally not allow any components on the emulated board to be tested. This represents a missed opportunity since, in many cases, certain components on the board being emulated were available.

One problem arising with the prior art approach is that the equipment used to emulate a missing or incomplete board was often too physically large and cumbersome to properly interconnect with the subsystems being tested. This situation would generally prevent the test from occurring within a natural environment such as the computer case in which the ultimate computer system would be placed. A further problem with prior art interim diagnostic approaches is that pattern generators are commonly employed to transmit data to the system under test to emulate the operation of the missing equipment. The signals available from the pattern generator however, are generally much slower than those produced by the equipment being emulated. Under such circumstances, it is difficult to acquire information regarding the behavior of the system under test in response to high data transmission rates.

Accordingly, it is a problem in the art that prior art interim computer system diagnostic equipment is generally too large to operate within the same physical environment as the ultimate product being emulated.

It is a further problem in the art that prior art diagnostic equipment is generally unable to supply data transmission rates which fully exercise the system under test.

It is a still further problem in the art that prior art emulation methods emulate entire boards, thereby preventing testing of components on the board being emulated which are physically available at the time the test is conducted.

SUMMARY OF THE INVENTION

These and other objects, features and technical advantages are achieved by a system and method which emulates unavailable equipment within a computer system at a chip or IC package level, is compact enough to enable the system under test to operate in its natural operating environment, and provides data transmission speed sufficiently to properly exercise the system under test. Moreover, since the inventive system may emulate equipment at the chip level, components on the same board as the chip or device being emulated may be tested as well as equipment on other boards. The chip being emulated may be an ASIC (application specific integrated chip) or general purpose integrated chip. In a preferred embodiment, the inventive system generally connects directly into a slot where the missing ASIC or other chip would reside once a production version of the missing chip is ready, thereby providing a high level of correspondence between the test environment and actual ultimate operating environment.

In a preferred embodiment, the inventive system includes a pattern generator, a control unit having processing, timing, and memory devices or components, cabling leading to a test board, and a conductive interface, such as an interposer, for interfacing the test board to a board within the system under test.

In a preferred embodiment, the inventive system employs the pattern generator to generate a sequence of test patterns at a speed typical of the pattern generator and stores the test patterns in memory equipment (or data storage equipment) within the control unit or control system. Once a complete set of test patterns is loaded into memory, the control system operates to transmit the stored test patterns from the control unit data storage toward the system under test at a higher frequency than that provided by the pattern generator. In this manner, the pattern generator may be beneficially employed to provide the information contained in the test patterns and separate equipment may then transmit the stored data at rates exceeding the transmission capabilities of the pattern generator in order to more fully exercise the system under test. Equipment is deployed which may transmit the stored test patterns out of memory at a selected multiple of the frequency at which the test pattern data is initially stored in the control unit memory.

Accordingly, it is an advantage of a preferred embodiment of the present invention that the system under test may operate in its normal operating environment during diagnostic operations.

It is a further advantage of a preferred embodiment of the present invention that equipment on the board housing the emulated device may be tested in addition to equipment on other boards in the system under test.

It is a still further advantage of a preferred embodiment of the present invention that data patterns may be transmitted at a high enough frequency to more fully exercise the operation of the system under test than did systems of the prior art.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
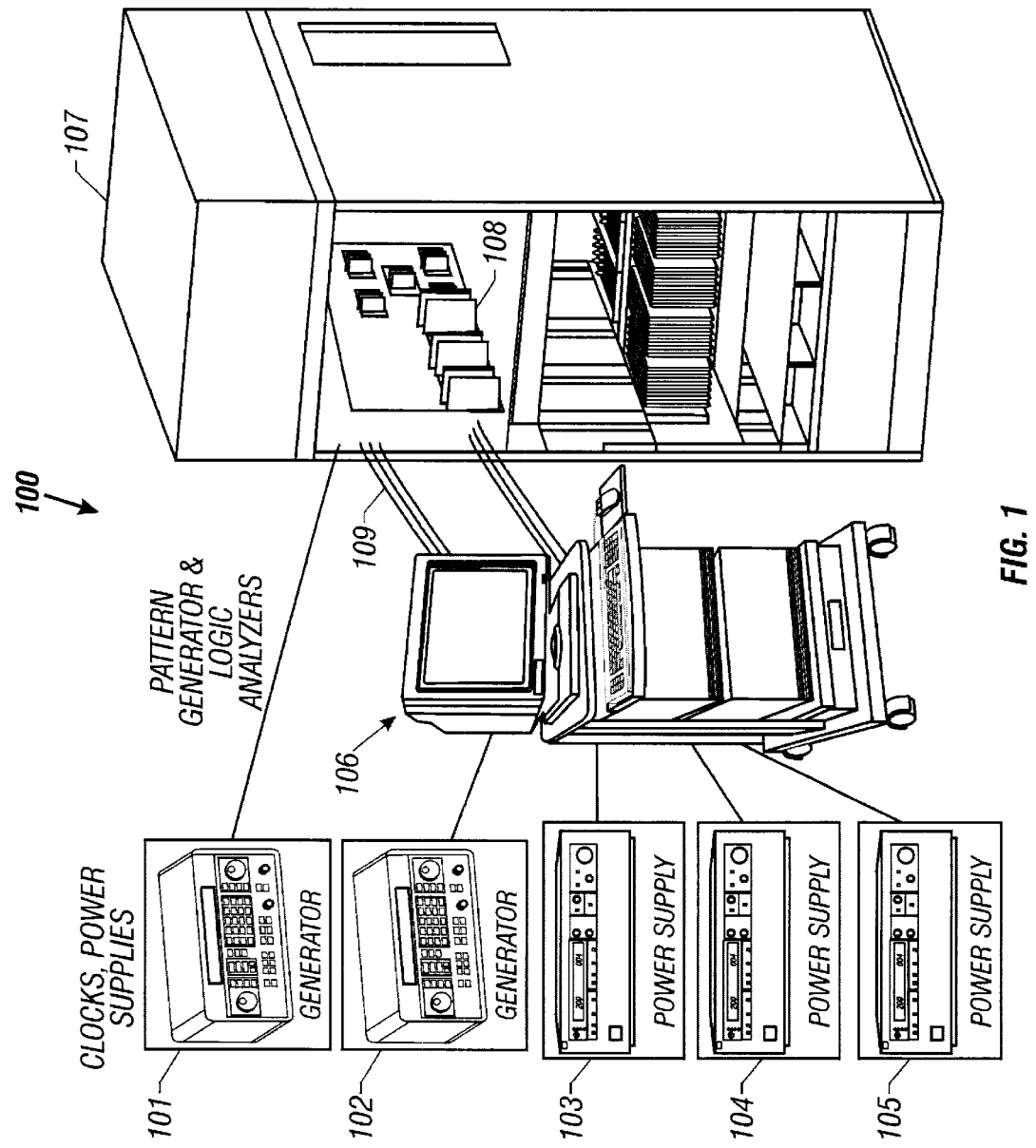
FIG. 1 depicts an overall view of the equipment associated with the test apparatus according to a preferred embodiment of the present invention.

FIG. 1 depicts an overall view 100 of the equipment associated with the test apparatus according to a preferred embodiment of the present invention. FIG. 1 presents general groupings of the equipment pertinent to the test apparatus of the present invention. On the right, reference numeral 107 points to a box which is preferably a mainframe computer which houses a board containing the system under test 108.

Control equipment 106 is shown connected to the system under test 108 via cabling 109. Preferably, control equipment 106 employs cabling 109 to transmit stored data patterns at high speed from control equipment 106 to system under test 108. Cabling 109 preferably leads to an attachment location (not shown) suitable for attachment of an ASIC or other integrated chip device. On the left, items 101–105 preferably operate to supply power and data patterns to control equipment 106. Preferably, generator 102 transmits data to control equipment 106 to store the data patterns in memory included in control equipment 106 prior to retransmission of such stored data patterns to system under test 108. Generator 101 preferably operates to control certain operations of system under test 108.

Figure 2:
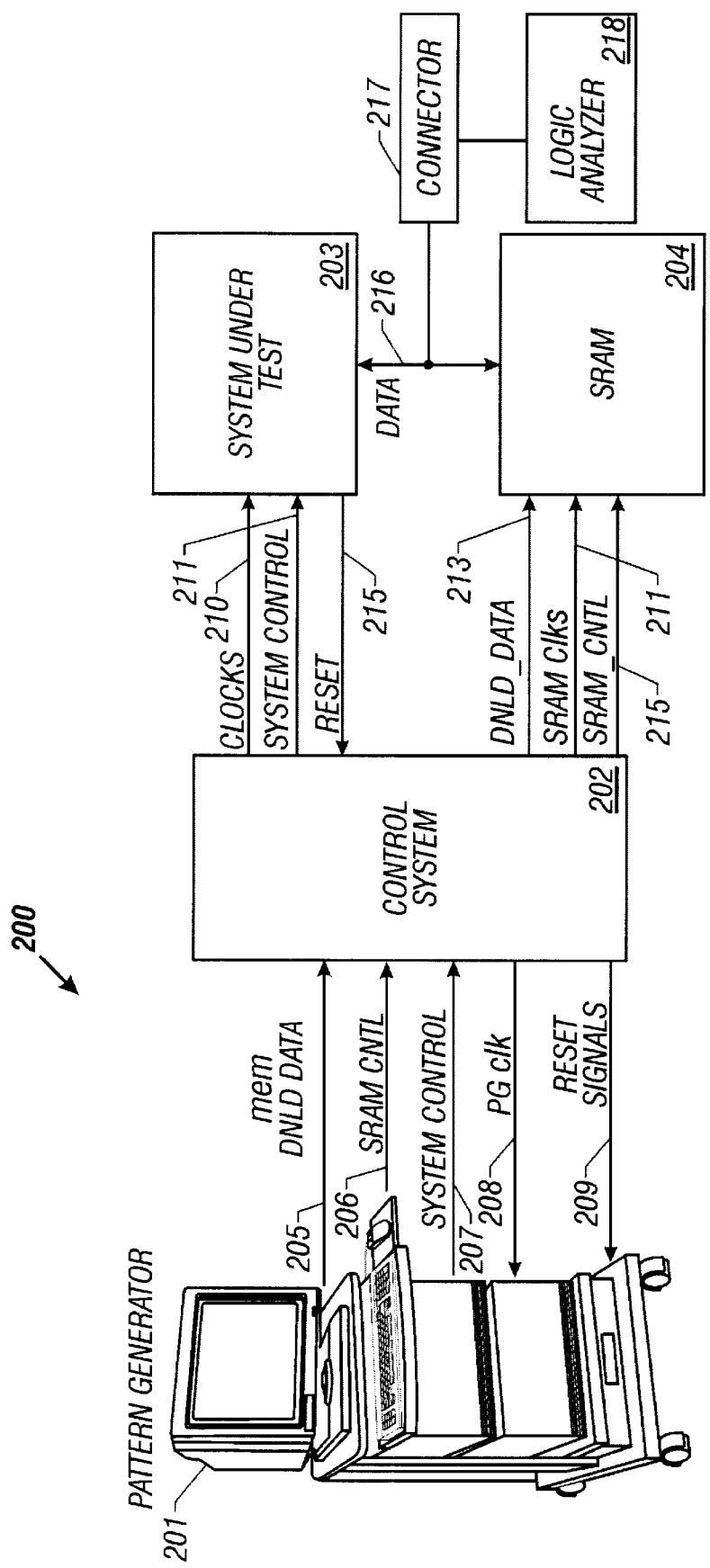
FIG. 2 is a block diagram of the functional components of the test apparatus according to a preferred embodiment of the present invention.

FIG. 2 depicts a block diagram of the functional components of the test apparatus according to a preferred embodiment of the present invention.

In a preferred embodiment, pattern generator 201 generally corresponds to items 101 through 105 in FIG. 1, the combination of control system 202 and SRAM 204 (Static Random Access Memory) generally corresponds to control equipment 106 in FIG. 1, and system under test 203 generally corresponds to system under test 108 depicted in FIG. 1. It will be appreciated that SRAM 204 may comprise single SRAM chip or a plurality of SRAM chips. Moreover, a range of memory device types may be substituted for SRAM in element 204, and all such variations are included in the scope of the present invention.

In a preferred embodiment, pattern generator 201 operates to coordinate transmission of data patterns from pattern generator 201 to control system 202 which transmission generally occurs at the normal operating frequency of pattern generator 201. The transmitted data patterns are preferably stored in SRAM 204 or on an alternate memory device. In a second phase of operation, clocks and control 201 preferably coordinates a high speed transfer of data from SRAM 204 to the system under test 203.

In a preferred embodiment, a diagnostic operation may proceed according the following sequence of events. Power from pattern generator 201 is preferably supplied to control system 202 thereby initializing control system 202 and SRAM 204. Upon powering up, control system 202 preferably transmits a clock to pattern generator 201 to synchronize pattern generator 201 with tester board 202. Upon synchronization of pattern generator 201 and control system 202, pattern generator preferably executes a program stored on storage media accessible to pattern generator 201 to coordinate transmission of data to control system 202.

In a preferred embodiment, pattern generator 201 transmits data to control system 202 which data includes test pattern data to be stored in SRAM 204 as well as control data to designate the addresses on the SRAM in which the test pattern data will be stored. At this stage, the pattern generator 201, control system 202 and SRAM 204 are generally operating at the same frequency. Thus, the command "memory download data" 205 preferably operates to transmit data from pattern generator 201 to control system 202 and on to SRAM 204. SRAM control command 206 preferably operates to provide control system 202 with control data for appropriately directing downloaded data toward designated destinations within SRAM 204. Preferably, system control command 207 operates to enable control of the system under test 203 by pattern generator 201. During initial loading of test pattern data to SRAM 204 from pattern generator 201, system control 207 preferably keeps system under test 203 in a reset mode. By way of explanation of certain terms and abbreviations in FIG. 2, PG clk generally refers to a pattern generator clock—a clock synchronized with the pattern generator. "Reset signals" generally operate to instruct the pattern generator 201 when to execute a file or program.

In a preferred embodiment, a first phase of operation of system 200 involves having pattern generator 201 transmit data to control system 202 for storage in SRAM 204. Pattern generator 201 is preferably able to specify precisely which storage locations in SRAM 204 will and will not be used during the downloading of data patterns for subsequent transmission to the system under test 203. Preferably, test pattern data transmitted to SRAM 204 is stored in an order which is strategically selected to control the sequence of delivery of such information to the system under test during a subsequent phase of the inventive process. Control system 202 may optionally modify data transmitted to it from pattern generator 201 for storage in SRAM 204 according to testing conditions under the control of tester board 202.

In a preferred embodiment, a second phase of operation is initiated in order to transmit data which was stored in SRAM 204 in a first phase to system under test 203. The data transfer from SRAM 204 to system under test 203 preferably occurs at a higher data transfer rate than the downloading of data from pattern generator 201 to SRAM 204 via control system 202 in a previous phase of system operation. To initiate this second phase, pattern generator 201 preferably operates to place system under test 203 in a mode to receive data employing system control command 207 to control system 202 which in turn activates system control command 211 between tester board 202 and system under test 203. Pattern generator 201 preferably also operates to direct SRAM to transmit data to system under test 203 along preferably bidirectional data path 216 at a new transmission rate employing SRAM control command 215 between tester board 202 and SRAM 204. Preferably, the SRAM 204 to system under test 203 transmission rate substantially exceeds the rate at which pattern generator 201 transmits data, thereby enabling high speed operation of system under test 203 to be fully exercised and evaluated. It will be appreciated that a variety of different command sets and configurations could be employed including providing for direct connections between pattern generator 201 and system under test 203 and between pattern generator 201 and SRAM 204, and all such variations are included in the scope of the present invention.

In a preferred embodiment, system under test 203 is initialized employing a combination of control lines 207 and 211. When system under test 203 is properly initialized, it preferably transmits a "ready" signal to control system 202 which preferably retransmits information of the system under test's ready condition to pattern generator 201.

Upon receiving this indication that the system under test 203 is ready to interact with the inventive testing mechanism, pattern generator 201 preferably initiates coordination of the transfer of data between SRAM 204 and system under test 203. Pattern generator 201 then preferably instructs system under test 203 to begin receiving data employing control commands 207 and 211. Pattern generator 203 preferably also modifies the clock frequency of SRAM 204 to transmit data at a high frequency to system under test 203 along preferably bidirectional data path 216. Exemplary values for the frequency used by the pattern generator and the higher frequency employed to transmit data from SRAM 204 to system under test 203 are 125 MHZ and 250 MHZ respectively. It will be appreciated however, that a range of frequencies may be employed by both the pattern generator and by the SRAM to system under test communication and a variety of ratios may exist between the two frequencies and all such variations are included within the scope of the present invention.

In a preferred embodiment, after receiving data transmission at a high frequency from SRAM 204, system under test 203 preferably processes this data and provides output (processed data) at the high frequency clock setting back toward SRAM 204 along bidirectional communication data path 216. The processed data transmitted from system under test 203 along path 216 is preferably directed to both SRAM 204 and to connector 217 which transmits the processed data in turn to logic analyzer 218. Logic analyzer 218 preferably examines the data to determine whether it is correct or not. The determination of data correctness may be made by comparing the data received at logic analyzer 218 to a preexisting data template containing an expected set of processed data values associated with a particular set of data pattern values originally transmitted to system under test 203.

In a preferred embodiment, pattern generator preferably operates to coordinate the transfer of processed data from system under test 203 toward both SRAM 204 and logic analyzer 218 employing control signals 207 and 211. In this manner then, the inventive system and method supplies data at a normal operating frequency of pattern generator 201 to selected memory storage locations in SRAM 204 for later transmission to system under test 203. Preferably, the test pattern data originating from pattern generator is effectively buffered in SRAM 204 until ready for high speed transmission to system under test 203.

Preferably, the stored data is then transmitted from SRAM 204 to system under test 203 at a substantially higher frequency thereby enabling system under test 203 to be exercised under high frequency conditions which is generally not feasible when directly connecting pattern generator 201 to system under test 203. Thereafter, system under test 203 processes the rapidly transmitted test pattern data and preferably transmits processed data back toward SRAM 204 while also transmitting such data to logic analyzer 218 for the purpose of evaluating the operational status of the system under test. The above approach preferably enables the benefits of a data pattern generating capability of pattern generator 201 to be combined with the high data transmission capability of SRAM 204 coupled to a high speed clock, thereby enabling the transmission speed limitations of pattern generator 201 to advantageously bypassed employing the features of a preferred embodiment of the present invention.

Figure 3:
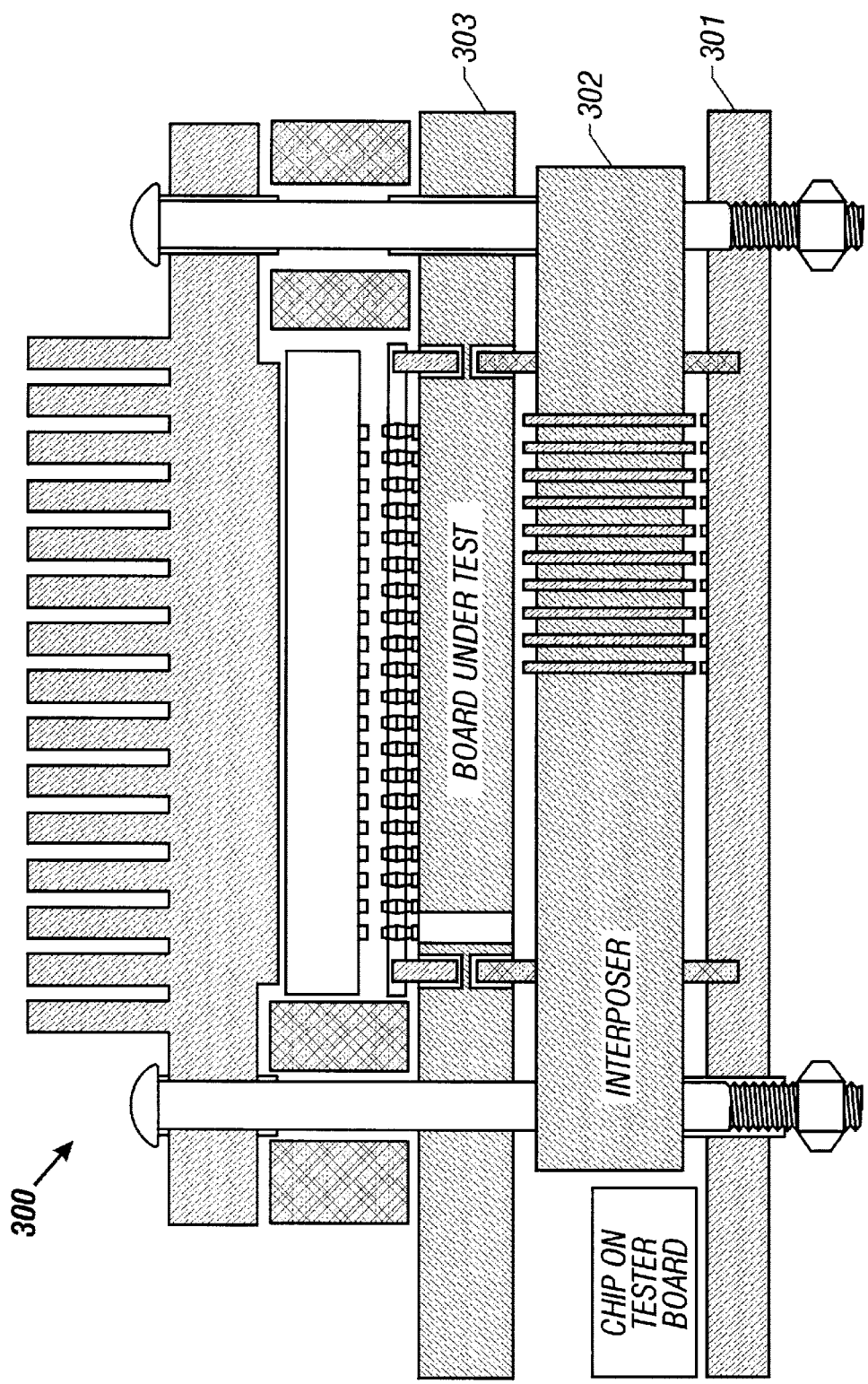
FIG. 3 depicts one mechanism for coupling test apparatus to the system under test according to a preferred embodiment of the present invention.

FIG. 3 depicts a cutaway view 100 of one mechanism for coupling test apparatus to the system under test according to a preferred embodiment of the present invention. Computer test board 301 is shown at the bottom of the cutaway view of FIG. 3. Equipment 301 generally corresponds to a subset of the equipment referred to by control system 202 depicted in FIG. 2. Board under test 303 generally corresponds to the equipment indicated by reference numeral 108 in FIG. 1. Test board 301 is preferably coupled to board under test 303 employing an intervening interposer 302 to provide electrical contact therebetween and thereby enable communication between test board 301 and board under test 303. The connection through interposer 302 preferably enables user data (data to be processed by board under test 303), control data, and clock synchronization signals to be transmitted back and forth between board under test 301 and test board 301. It will be appreciated that the embodiment of FIG. 3 is only one possible mechanism for interfacing testing equipment to equipment being tested and that numerous alternative connections may be employed and that all such variations are included within the scope of the present invention.

Figure 4:
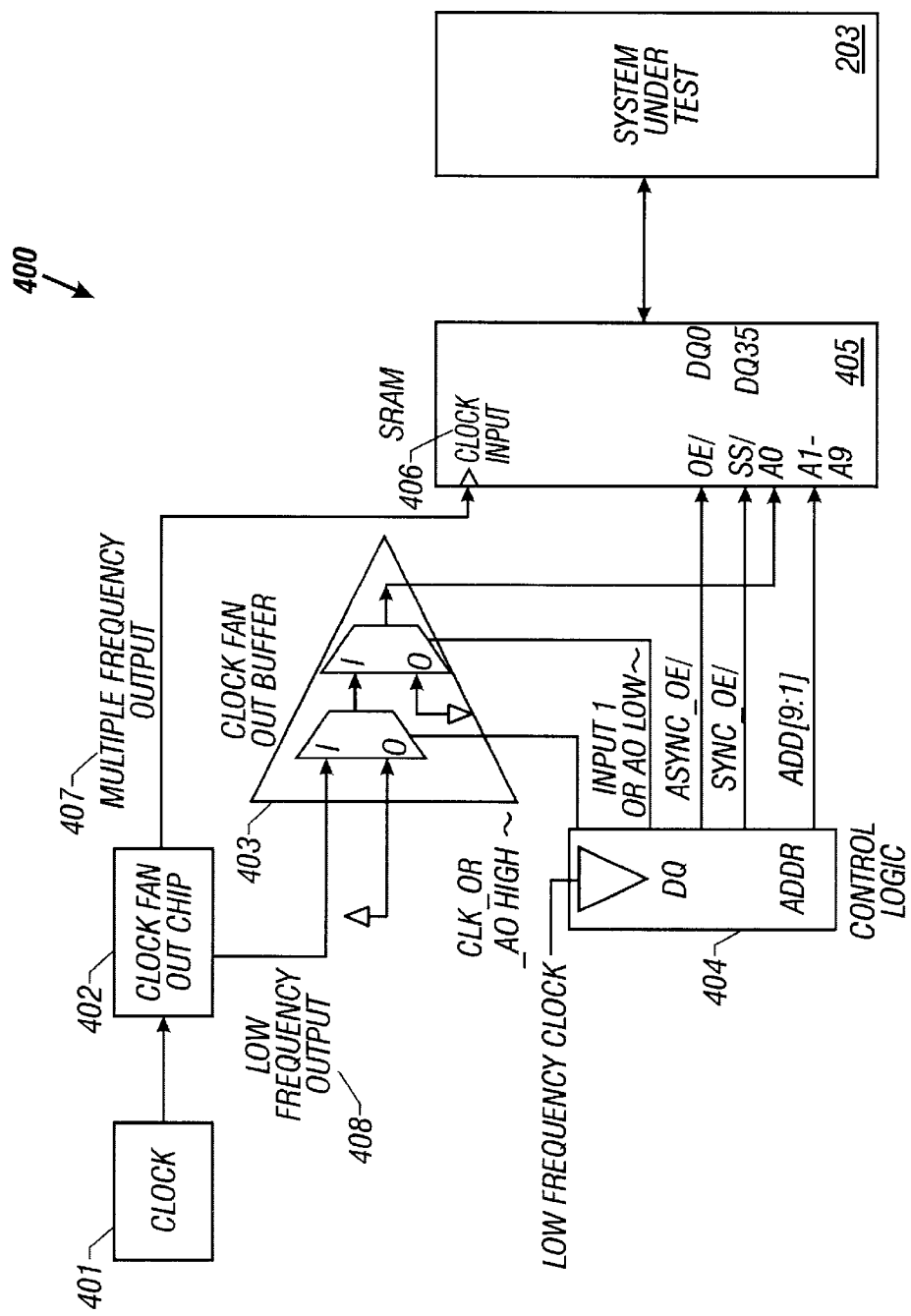
FIG. 4 is a circuit diagram for providing high frequency data patterns to a system under test according to a preferred embodiment of the present invention.

FIG. 4 depicts a circuit diagram 400 for providing high frequency data patterns to a system under test according to a preferred embodiment of the present invention. In FIG. 4 clock 401, clock fan out chip 402, clock fan-out buffer 403, and control logic 404 preferably correspond to subsets of control system 202 in FIG. 2. SRAM 405 preferably corresponds to SRAM 204 depicted in FIG. 2.

As discussed in connection with FIG. 2, two phases of operation are preferably employed to deliver test pattern data at a high transmission rate to system under test 203. A first phase preferably involves transmitting test pattern data from pattern generator 201 (FIG. 2) through control logic 404 into SRAM 405 employing a first frequency available from the pattern generator 201. A second phase preferably involves transmitting the stored data pattern information at a second, higher, transmission frequency toward system under test 203 from SRAM 405. The embodiment of FIG. 4 depicts one approach to accomplishing a multiple phase, multiple frequency approach to supplying high transmission speed test pattern data to system under test 203. It will be appreciated that fewer or more than two frequencies could be employed, having any possible number of arithmetic relationships between the employed frequencies. Moreover, any number of phases or stages of operation could be employed to deliver high speed test pattern data to system under test 203, and all such variations are included within the scope of the present invention.

In a preferred embodiment, clock 401 operates at a constant frequency which preferably corresponds to the highest of a plurality of frequencies employed within the system depicted in FIG. 4. Alternatively, either a multiple frequency clock or a plurality of clocks could be employed to provide the various frequencies employed in the present invention. The basic frequency from clock 401 is preferably communicated to clock fan-out chip 402, which may be an E222 chip (available from Motorola) which operates as a frequency divider and preferably includes a plurality of output ports. A first output from clock fan out chip 402 is marked "low frequency output" and generally provides a clock frequency equal to the basic frequency output from clock 401 divided by a selected value. A second output from clock fan out chip 402, marked "multiple frequency output" is preferably connected to clock input 406 on SRAM 405. The frequency on the line between clock fan out chip 402 and clock input 406 may preferably be varied according to which phase of the inventive method is currently active. Preferably, when loading SRAM 405 with data, multiple frequency output 407 is set to the same frequency as low frequency output 407. Whereas, when transmitting data from SRAM 405 to system under test 203, multiple frequency output 407 is preferably set to the basic frequency of clock 401 to enable high speed data transmission to system under test 203.

Preferably, in the embodiment of FIG. 4, two frequencies are employed, the higher of which is twice the lower frequency. More specifically, the lower frequency is preferably 125 MHz (megahertz), and the higher frequency is preferably set to 250 MHz. The following discussion will assume the use of these two frequencies. However, it will be appreciated that a range of frequencies could be used for the lower frequency and a range of multiples of the selected lower frequency could be employed for the higher frequency. Moreover, more than two total frequencies could be employed in the present invention, and all such variations are included in the scope of the present invention.

In a preferred embodiment, the control logic, SRAM 405 and clock input 406 preferably all operate at 125 MHz (meaning clock 401 frequency is preferably divided by 2). Preferably, before data is transmitted to SRAM 405, SRAM 405 is initialized, and system under test 203 is kept in reset as communication with system under test 203 is generally not conducted in this phase of the inventive method. After initialization is complete, control logic 404 preferably operates to transmit data to SRAM 405. Control logic 404 preferably operates to direct the transmitted data into carefully selected memory locations within SRAM 405. Once the test pattern data is completely loaded into SRAM 405, the inventive system preferably enters a second phase of operation in which the loaded data in SRAM 405 is transmitted to system under test 203.

In a preferred embodiment, during a second phase of the inventive method, multiple frequency output 407 is switched to operate at 250 MHZ and thereby runs the clock input 406 of SRAM 405 at 250 MHz. The control logic 404 preferably continues to operate at 125 MHz. When data was being loaded to SRAM 405 in phase one, discussed above, address bits A0 through A9 in SRAM 406 were all controlled by control logic 404. However, when unloading data in the SRAM 406 toward the system under test 203, the 125 MHz control logic is restricted to accessing address bits A1 through A9, thereby leaving the lowest order address bit, A0, alone.

In a preferred embodiment, during phase two, SRAM 406 address bit A0 is preferably continuously toggled at 125 MHz. Control logic 404 preferably effects this continuous toggling by controlling the output of clock fan-out buffer 103 to tie the 125 MHz clock line directly to address input bit A0. In this manner, A0 will preferably be accurately synchronized with clock input 406 although operating at 125 MHz instead of 250 MHz. The toggling of the A0 bit at 125 MHz preferably permits memory location address lines to be modified at 250 MHz.

By way of explanation of the above, when A0 is toggled at a frequency of 125 MHz, this means that a full cycle from 0 to 1 and back to 0 again is experienced every 8 nanoseconds. This indicates that two changes occur every 8 nanoseconds, or one change every 4 nanoseconds. Where the lowest bit is able to change every 4 nanoseconds, the SRAM address being accessed may be modified two hundred and fifty million times per second or at 250 MHz. The control logic addresses the upper level bits A1 to A9 at 125 MHz, which in combination with the above described control of the lowest address bit A0, enables the address locations accessed in the SRAM 405 during transfer of data toward system under test 203 to be modified at a rate of 250 MHz.

In a preferred embodiment, converting SRAM 405 from receiving data at 125 million data samples per second in phase one to transmitting 250 million data samples per second in phase two is accomplished by a) modifying clock fan out chip 402 to output 250 MHz instead of 125 MHZ and b) changing the input control to the lowest order address bit, A0, of SRAM 405 from conventional control by control logic 404 to a direct connection to a 125 MHz clock pulse which toggles the lowest order bit, A0, continuously. Thereafter, conventional control logic 404 control of the higher order address bits and the continuous toggling of lowest order bit A0 enables the address location specified by the inventive system to change every 4 nanoseconds, thereby enabling provision of a 250 MHz data transmission rate to system under test 203. Although the above discussion has described one way of enabling a change in data transmission for a single device, such as SRAM 405, it will be appreciated that other mechanisms exist for modifying the transmission rate of devices such as SRAM 405 and all such variations are included in the scope of the present invention.

In a preferred embodiment, since the lowest order address bit of SRAM 405 is automatically toggled during data transmission to the system under test 203 and therefore not under the control of control logic 404, a certain level of planning is preferably employed in phase one, when loading SRAM 405, to ensure that once automatic toggling of the A0 bit is activated, data samples emerge from SRAM 405 in a desired order.

Figure 5:
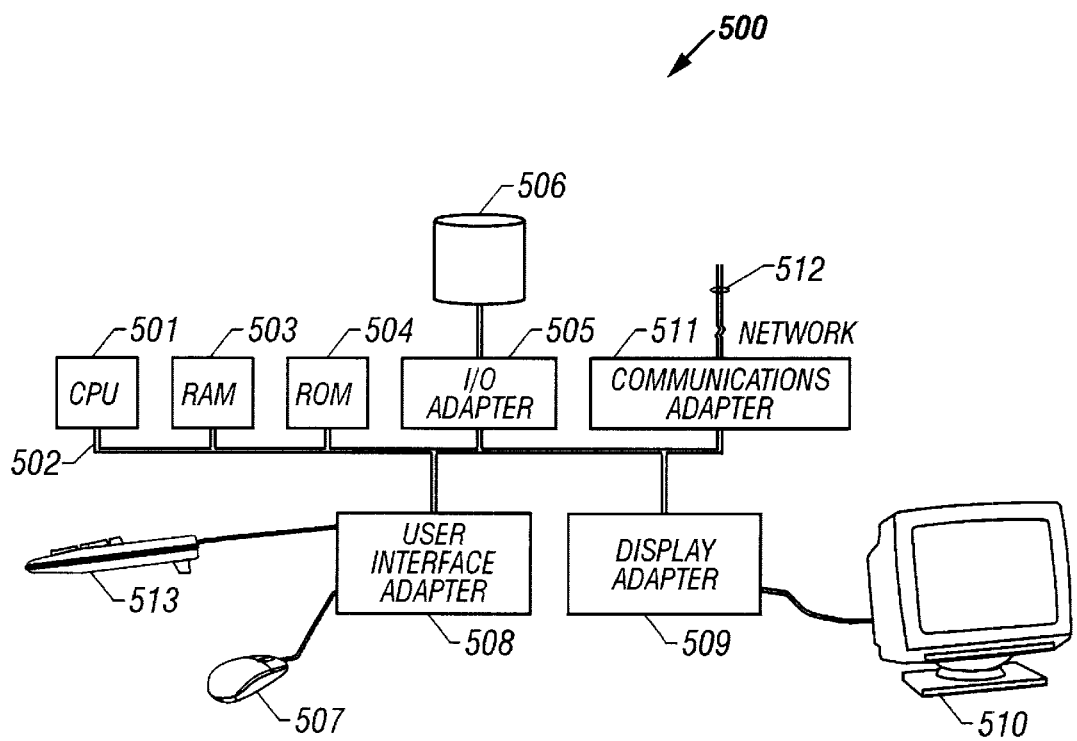
FIG. 5 depicts computer apparatus adaptable for use with a preferred embodiment of the present invention.

FIG. 5 illustrates computer system 500 adaptable for use with a preferred embodiment of the present invention. Central processing unit (CPU) 501 is coupled to system bus 502. The CPU 501 may be any general purpose CPU, such as an HP PA-8200. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

The bus 502 is also coupled to input/output (I/O) adapter 505, communications adapter card 511, user interface adapter 508, and display adapter 509. The I/O adapter 505 connects to storage devices 506, such as one or more of hard drive, CD drive, floppy disk drive, tape drive, to the computer system. Communications adapter 511 is adapted to couple the computer system 500 to a network 512, which may be one or more of local (LAN), wide-area (WAN), Ethernet or Internet network. User interface adapter 508 couples user input devices, such as keyboard 513 and pointing device 507, to the computer system 500. The display adapter 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for emulating a high speed component absent from a computer system under test, the method comprising the steps of:

communicating test pattern data to a storage device at a first frequency; and transmitting said communicated test pattern data from said storage device to said system under test at a second frequency substantially matching a frequency of operation of said absent high speed component.

2. The method of claim 1 further comprising the step of:
   directing said transmitted communicated data directly into a slot for said absent component.

3. The method of claim 1 further comprising the step of:
   employing a pattern generator for said step of communicating.

4. The method of claim 1 further comprising the step of:
   deploying static random access memory to serve as said storage device.

5. The method of claim 1 wherein the method for emulating comprises the step of:
   emulating an application specific integrated chip.

6. The method of claim 1 further comprising the step of:
   employing a clock to coordinate said step of communicating with said storage device.

7. The method of claim 6 further comprising the step of:
   employing a clock fan-out chip to modify a frequency of operation of said storage device in between said step of communicating and said step of transmitting.

8. The method of claim 1 wherein the step of transmitting comprises the steps of:
   accessing higher order address bits of said storage device employing control logic; and
   continuously toggling a lowest order address bit of said storage device so as to change bit values of said lowest order address bit at said second frequency.

9. The method of claim 1 further comprising the steps of:
   processing said transmitted communicated data in said system under test;
   outputting said processed data to a logic analyzer; and
   evaluating a status of said system under test based on said outputted processed data.

10. Apparatus for transmitting data to a system under test at a frequency substantially matching a frequency of operation of a component absent from the system under test, the apparatus comprising:

a pattern generator for generating test pattern data at a first frequency;

a memory system for receiving said generated test pattern data at said first frequency;

a clock circuit for causing said memory system to operate at a second frequency substantially matching said frequency of operation of said absent component; and control logic for coordinating transmission of said received generated test pattern data to said system under test at said second frequency.

11. The apparatus of claim 10 further comprising:
    a test board for direct attachment to a location of said absent component on said system under test.

12. The apparatus of claim 10 wherein said memory system comprises:
    a lowest order address bit controlled by said control logic during generation of test pattern data at said first frequency.

13. The apparatus of claim 10 wherein the memory system comprises:
    a lowest order address bit coupled to a clock in said clock circuit during transmission of said received generated test pattern to said system under test.

14. The apparatus of claim 10 wherein said memory system comprises: static random access memory.

15. The apparatus of claim 10 wherein the clock circuit comprises:
    a clock; and
    a clock fan out chip coupled to said clock.

16. The apparatus of claim 15 wherein the clock circuit further comprises:
    a clock input in said memory system coupled to said clock fan out chip.

17. A system for emulating an ASIC to test a computer sub-system, the system comprising:

means for communicating test pattern data at a first frequency from a pattern generator;

means for buffering said communicated test pattern data in a data storage device; and means for transmitting said buffered communicated test pattern data from said data storage device to said computer sub-system at a second frequency, wherein said second frequency substantially matches a frequency of operation of said ASIC.

18. The system of claim 17 further comprising:
    means for altering a frequency of operation of said data storage device from said first frequency to said second frequency.

19. The system of claim 17 further comprising:
    means for mechanically coupling said system for emulating directly to a slot for said ASIC on said computer sub-system.

20. The system of claim 17 further comprising:
    means for synchronizing a lowest order address bit of said data storage device with said means for transmitting.

\* \* \* \* \*